United States Patent
Pruitt et al.

(10) Patent No.: US 9,932,029 B2
(45) Date of Patent: Apr. 3, 2018

(54) SYSTEM AND METHOD FOR BALANCING STATES OF CHARGE OF ENERGY STORAGE MODULES IN HYBRID VEHICLES

(71) Applicant: Allison Transmission, Inc., Indianapolis, IN (US)

(72) Inventors: Perry Pruitt, Noblesville, IN (US); Kurt Biehl, Lebanon, IN (US); Justin Langford, Zionsville, IN (US); Jonathan Kellerman, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/838,441

(22) Filed: Aug. 28, 2015

(65) Prior Publication Data

US 2015/0367836 A1  Dec. 24, 2015

Related U.S. Application Data

(63) Continuation of application No. PCT/US2014/021068, filed on Mar. 6, 2014.
(Continued)

(51) Int. Cl.
*B60L 9/00* (2006.01)
*H02J 7/00* (2006.01)
(Continued)

(52) U.S. Cl.
CPC .......... *B60W 20/106* (2013.01); *B60L 1/003* (2013.01); *B60L 11/14* (2013.01); *B60L 11/1862* (2013.01);
(Continued)

(58) Field of Classification Search
USPC ............................................ 701/22; 320/118
See application file for complete search history.

(56) References Cited

U.S. PATENT DOCUMENTS

| 5,378,555 | A | | 1/1995 | Waters | |
|---|---|---|---|---|---|
| 5,969,624 | A | * | 10/1999 | Sakai | B60K 6/46 180/65.245 |

(Continued)

FOREIGN PATENT DOCUMENTS

| EP | 2 211 439 A1 | 7/2010 |
|---|---|---|
| JP | 2002-204538 A | 7/2002 |

(Continued)

OTHER PUBLICATIONS

International Search Report and Written Opinion issued in PCT/US2014/017964, dated Jun. 24, 2014, 11 pgs.
(Continued)

*Primary Examiner* — Thomas G Black
*Assistant Examiner* — Tyler Paige
(74) *Attorney, Agent, or Firm* — Woodard, Emhardt, Moriarty, McNett & Henry LLP

(57) ABSTRACT

A system and method for balancing the states of charge between a plurality of energy storage modules in a hybrid vehicle is disclosed. The method comprises determining states of charge of individual energy storage modules in said plurality of energy storage modules operatively connected to a power source in the hybrid electric vehicle. The vehicle is operated using a subset of the plurality of energy storage modules when the states of charge of said subset the plurality of energy storage modules is outside of a tolerances relative to the remaining energy storage modules of said plurality of said energy storage modules. The energy storage
(Continued)

modules may be charged or discharged using the method in order to equalize the states of charge of the energy storage modules.

26 Claims, 4 Drawing Sheets

Related U.S. Application Data

(60) Provisional application No. 61/789,526, filed on Mar. 15, 2013.

(51) Int. Cl.
- *B60W 20/00* (2016.01)
- *B60L 1/00* (2006.01)
- *B60L 11/14* (2006.01)
- *B60L 11/18* (2006.01)
- *B60L 15/20* (2006.01)
- *B60W 10/26* (2006.01)
- *B60W 20/13* (2016.01)

(52) U.S. Cl.
CPC ....... *B60L 11/1866* (2013.01); *B60L 11/1868* (2013.01); *B60L 15/20* (2013.01); *B60W 10/26* (2013.01); *B60W 20/13* (2016.01); *H02J 7/0014* (2013.01); *B60L 2210/10* (2013.01); *B60L 2210/40* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2250/16* (2013.01); *Y02T 10/645* (2013.01); *Y02T 10/70* (2013.01); *Y02T 10/7005* (2013.01); *Y02T 10/7044* (2013.01); *Y02T 10/7061* (2013.01); *Y02T 10/7066* (2013.01); *Y02T 10/7077* (2013.01); *Y02T 10/7216* (2013.01); *Y02T 10/7241* (2013.01); *Y02T 10/7275* (2013.01); *Y10S 903/907* (2013.01)

(56) References Cited

U.S. PATENT DOCUMENTS

| | | | |
|---|---|---|---|
| 6,139,351 A | 10/2000 | Schaefer et al. | |
| 6,189,635 B1 | 2/2001 | Schuler | |
| 6,441,588 B1 | 8/2002 | Yagi et al. | |
| 6,469,403 B2 | 10/2002 | Omata et al. | |
| 6,518,732 B2 | 2/2003 | Palanisamy | |
| 6,632,560 B1 | 10/2003 | Zhou | |
| 6,686,724 B2 | 2/2004 | Coates et al. | |
| 6,727,676 B2 | 4/2004 | Ochiai | |
| 6,904,342 B2 | 6/2005 | Hanada et al. | |
| 7,009,401 B2 | 3/2006 | Kinoshita et al. | |
| 7,015,676 B2 | 3/2006 | Kohama et al. | |
| 7,021,409 B2 | 4/2006 | Tamor | |
| 7,078,877 B2 | 7/2006 | Salasoo et al. | |
| 7,084,361 B1 | 8/2006 | Bowes et al. | |
| 7,131,708 B2 | 11/2006 | Tao et al. | |
| 7,144,647 B2 | 12/2006 | Sugita | |
| 7,295,902 B2 | 11/2007 | Chen et al. | |
| 7,305,873 B2 | 12/2007 | Hubbard et al. | |
| 7,317,978 B2 | 1/2008 | Ashizawa | |
| 7,402,068 B1 | 7/2008 | Tarchiniski | |
| 7,407,026 B2 | 8/2008 | Tamor | |
| 7,449,891 B2 | 11/2008 | Cawthorne | |
| 7,479,761 B2 | 1/2009 | Okumura | |
| 7,482,767 B2 | 1/2009 | Tether | |
| 7,486,036 B2 | 2/2009 | Oyobe et al. | |
| 7,521,935 B2 | 4/2009 | Uchida | |
| 7,538,520 B2 | 5/2009 | Zettel et al. | |
| 7,550,946 B2 | 6/2009 | Zettel et al. | |
| 7,586,722 B2 | 9/2009 | Scholer et al. | |
| 7,613,003 B2 | 11/2009 | Pavlovic et al. | |
| 7,631,712 B2 | 12/2009 | Watanabe | |
| 7,639,018 B2 | 12/2009 | Zettel et al. | |
| 7,645,209 B2 | 1/2010 | Dreibbolz et al. | |
| 7,654,932 B2 | 2/2010 | Gohring et al. | |
| 7,657,350 B2 | 2/2010 | Moran | |
| 7,661,370 B2 | 2/2010 | Pike et al. | |
| 7,677,341 B2 | 3/2010 | Tomo | |
| 7,719,238 B2 | 5/2010 | Iida et al. | |
| 7,730,984 B2 | 6/2010 | Heap et al. | |
| 7,768,235 B2 | 8/2010 | Tae et al. | |
| 7,770,676 B2 | 8/2010 | Tenbrock et al. | |
| 7,770,678 B2 | 8/2010 | Nozaki et al. | |
| 7,784,575 B2 | 8/2010 | Yamanaka et al. | |
| 7,795,844 B2 | 9/2010 | Ichikawa et al. | |
| 7,800,345 B2 | 9/2010 | Yun et al. | |
| 7,813,865 B2 | 10/2010 | Martin | |
| 7,828,693 B2 | 11/2010 | Soliman et al. | |
| 7,836,985 B2 | 11/2010 | Itoh | |
| 7,863,789 B2 | 1/2011 | Zepp et al. | |
| 7,865,287 B2 | 1/2011 | Huseman | |
| 7,878,282 B2 | 2/2011 | Kumazaki et al. | |
| 7,893,637 B2 | 2/2011 | Suhama et al. | |
| 7,908,064 B2 | 3/2011 | Cawthorne et al. | |
| 7,923,950 B2 | 4/2011 | Takahashi | |
| 7,928,699 B2 | 4/2011 | Kohn | |
| 7,935,015 B2 | 5/2011 | Tabata et al. | |
| 7,967,091 B2 | 6/2011 | Yamazaki et al. | |
| 7,977,896 B2 | 7/2011 | Heap et al. | |
| 7,987,934 B2 | 8/2011 | Huseman | |
| 7,998,023 B2 | 8/2011 | Holmes et al. | |
| 8,000,866 B2 | 8/2011 | Heap et al. | |
| 8,002,667 B2 | 8/2011 | Hsieh et al. | |
| 8,010,247 B2 | 8/2011 | Heap et al. | |
| 8,020,652 B2 | 9/2011 | Bryan et al. | |
| 8,022,674 B2 | 9/2011 | Miura | |
| 8,029,408 B2 | 10/2011 | Seel | |
| 8,030,883 B2 | 10/2011 | Katayama | |
| 8,035,324 B2 | 10/2011 | Heap | |
| 8,035,349 B2 | 10/2011 | Lubawy | |
| 8,047,959 B2 | 11/2011 | Fuechtner et al. | |
| 8,053,921 B2 | 11/2011 | Ichikawa | |
| 8,063,609 B2 | 11/2011 | Salasoo et al. | |
| 8,078,417 B2 | 12/2011 | Ishishita | |
| 8,082,743 B2 | 12/2011 | Hermann et al. | |
| 8,091,667 B2 | 1/2012 | Zettel et al. | |
| 8,098,050 B2 | 1/2012 | Takahashi | |
| 2002/0011935 A1 | 1/2002 | Kim | |
| 2004/0224195 A1* | 11/2004 | Huang | H01M 10/42 429/406 |
| 2007/0090803 A1 | 4/2007 | Yun et al. | |
| 2007/0111089 A1 | 5/2007 | Swan | |
| 2008/0018111 A1 | 1/2008 | Yaguchi | |
| 2008/0050645 A1 | 2/2008 | Kai et al. | |
| 2008/0215201 A1 | 9/2008 | Okubo et al. | |
| 2008/0224478 A1 | 9/2008 | Tamor | |
| 2009/0037060 A1 | 2/2009 | Carlhammar et al. | |
| 2009/0053588 A1 | 2/2009 | Marukawa | |
| 2009/0086462 A1 | 4/2009 | Funato et al. | |
| 2009/0118929 A1 | 5/2009 | Heap et al. | |
| 2009/0118941 A1 | 5/2009 | Heap | |
| 2009/0118964 A1 | 5/2009 | Snyder et al. | |
| 2009/0118971 A1 | 5/2009 | Heap et al. | |
| 2009/0157243 A1 | 6/2009 | Kim | |
| 2009/0204280 A1 | 8/2009 | Simon, Jr. | |
| 2009/0234524 A1 | 9/2009 | Kim | |
| 2009/0243518 A1 | 10/2009 | Itoh | |
| 2009/0243554 A1 | 10/2009 | Gu et al. | |
| 2009/0260903 A1 | 10/2009 | Park | |
| 2009/0308674 A1 | 12/2009 | Bhattarai et al. | |
| 2010/0116235 A1 | 5/2010 | Imamura et al. | |
| 2010/0121511 A1* | 5/2010 | Onnerud | B60L 11/1851 701/22 |
| 2010/0125019 A1 | 5/2010 | Tabata et al. | |
| 2010/0222953 A1 | 9/2010 | Tang | |
| 2010/0250037 A1 | 9/2010 | Yoshida et al. | |
| 2010/0250042 A1 | 9/2010 | Shamoto | |
| 2010/0262308 A1 | 10/2010 | Anderson et al. | |

(56) References Cited

U.S. PATENT DOCUMENTS

| | | |
|---|---|---|
| 2010/0263952 A1 | 10/2010 | Richter et al. |
| 2010/0286855 A1 | 11/2010 | Yang |
| 2010/0299036 A1 | 11/2010 | Vespasien |
| 2010/0305770 A1* | 12/2010 | Bhowmik ............ H02J 7/0014 700/295 |
| 2010/0312422 A1 | 12/2010 | Imaseki |
| 2011/0010032 A1 | 1/2011 | Kozarekar |
| 2011/0025258 A1* | 2/2011 | Kim .................... H02J 7/0013 320/106 |
| 2011/0040433 A1 | 2/2011 | Steurnagel |
| 2011/0048823 A1 | 3/2011 | Connolly et al. |
| 2011/0082607 A1* | 4/2011 | Chorian ............... B60K 6/445 701/22 |
| 2011/0125352 A1 | 5/2011 | McGrogan et al. |
| 2011/0127962 A1* | 6/2011 | Murao ................. H02J 7/0016 320/118 |
| 2011/0130904 A1 | 6/2011 | McGrogan et al. |
| 2011/0301791 A1 | 12/2011 | Swales et al. |
| 2011/0316483 A1* | 12/2011 | Zhang ................. H01M 10/441 320/118 |
| 2011/0320075 A1 | 12/2011 | Kim et al. |
| 2012/0041625 A1 | 2/2012 | Kelty et al. |
| 2012/0083948 A1 | 4/2012 | Tate, Jr. et al. |
| 2012/0139491 A1* | 6/2012 | Eberhard ............. H02J 7/0016 320/118 |
| 2012/0182021 A1* | 7/2012 | McCoy ............... G01R 31/3606 324/433 |
| 2013/0049698 A1 | 2/2013 | Jung |
| 2013/0106357 A1* | 5/2013 | Girard ................. B60L 11/1864 320/126 |
| 2013/0154567 A1* | 6/2013 | Peterson ............. H02J 7/0063 320/118 |
| 2014/0015532 A1* | 1/2014 | Uchida ............... G01R 31/3606 324/426 |
| 2014/0049224 A1* | 2/2014 | Hua ..................... H02J 7/0068 320/136 |
| 2014/0114594 A1* | 4/2014 | Schaefer ............. B60L 11/1866 702/63 |
| 2014/0356656 A1* | 12/2014 | Chen ................... H01M 10/441 429/62 |

FOREIGN PATENT DOCUMENTS

| | | |
|---|---|---|
| JP | 2010 028881 A | 2/2010 |
| JP | 2010028881 A | 2/2010 |
| KR | 10-2013-0020946 A | 3/2013 |
| WO | WO 2010/092330 A1 | 8/2010 |
| WO | WO 2012/078721 A2 | 6/2012 |

OTHER PUBLICATIONS

International Search Report and Written Opinion issued in PCT/US2014/021068, dated Jul. 17, 2014, 16 pgs.

* cited by examiner

SYSTEM AND METHOD FOR BALANCING STATES OF CHARGE OF ENERGY STORAGE MODULES IN HYBRID VEHICLES

CROSS REFERENCE TO RELATED APPLICATIONS

This application is a continuation of International Application No. PCT/US2014/021068 filed Mar. 6, 2014, which claims the benefit of U.S. Provisional Application No. 61/789,526 filed Mar. 15, 2013, which are hereby incorporated by reference in their entirety.

BACKGROUND

The present invention generally relates to energy storage systems for hybrid electric vehicles, and, more particularly, to a system and method for balancing the state of charge of energy storage modules in a hybrid electric vehicle.

Over the past few years, there has been a growing concern over global climate change due to an increase in carbon dioxide levels as well as oil supply shortages. As a result, some automobile manufactures and consumers are beginning to have a greater interest in motor vehicles having low emissions and greater fuel efficiency. One viable option is a hybrid electric vehicle (HEV) which allows the vehicle to be driven by an electric motor, combustion engine, or a combination of the two.

Though various features are important to the overall HEV design, the system which stores the energy available for use by the vehicle is a key component. The energy storage system is provided within the HEV to store the energy created by a generator in order for that energy to be available for use by the hybrid system at some later time. For example, the stored energy may be used to drive an electric motor to independently propel the motor vehicle or assist the combustion engine, thereby reducing gasoline consumption.

However, energy storage systems face a variety of design complications. One of the major concerns during operation is maintaining a proper balance between the packs with respect to the state of charge (SOC) of individual packs in a multi-pack energy storage system. It is important that the individual packs are maintained at a SOC within a certain tolerance with respect to one another. If the difference in SOC between packs exceeds the tolerance, damage to the vehicle's electrical components can occur.

Prior art systems have thus far achieved pack or cell balancing with complicated hardware and circuitry which suffers from various drawbacks, such as inefficiency, increased cost, and increased risk of failure. In addition, prior systems have focused on transferring charge between packs, which results in energy loss due to the inefficiency of the transfer process.

Thus, there is a need for improvement in this field.

SUMMARY

The system and method described herein addresses several of the issues mentioned above as well as others. According to one aspect, a method of balancing the state of charge of a plurality of energy storage modules in a hybrid vehicle is presented, comprising determining states of charge of individual energy storage modules in said plurality of energy storage modules, the energy storage modules operatively connected to a power source in the hybrid electric vehicle, and operating the hybrid vehicle using a subset of the plurality of energy storage modules when the states of charge of said subset of energy storage modules is outside of a tolerance relative to the remaining energy storage modules of said plurality of said energy storage modules. A system for implementing the method is also presented.

Further forms, objects, features, aspects, benefits, advantages, and embodiments of the present invention will become apparent from a detailed description and drawings provided 4herewith.

DETAILED DESCRIPTION

Figure 1:
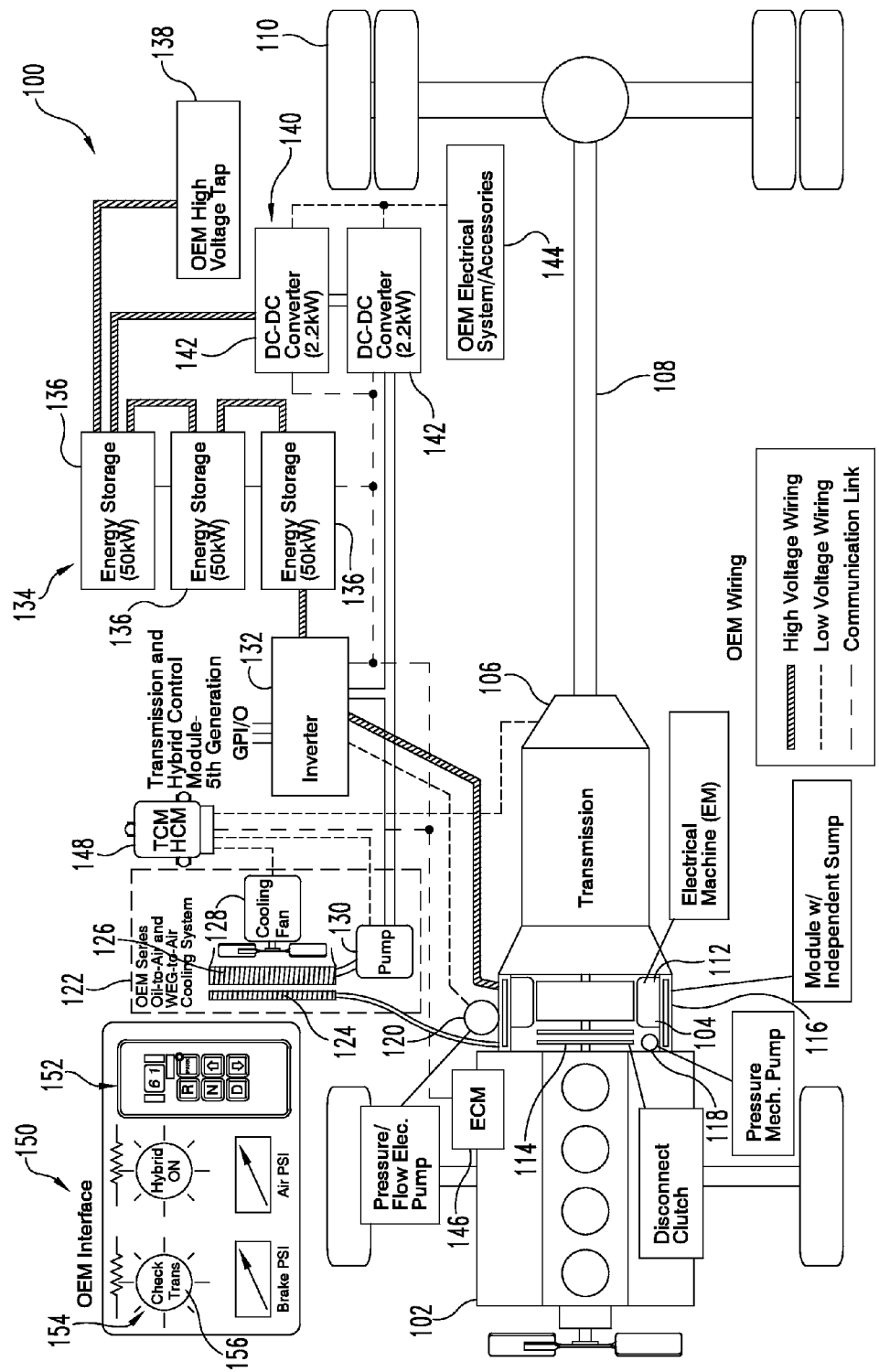
FIG. 1 illustrates a diagrammatic view of one example of a system for balancing energy storage modules in a hybrid vehicle according to one embodiment.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 from the eMachine 112 and the transmission 106.

The hybrid module 104 is designed to operate as a self-sufficient unit, that is, it is generally able to operate independently of the engine 102 and transmission 106. The hybrid module 104 includes a sump 116 that stores and supplies fluids, such as oil, lubricants, or other fluids, to the hybrid module 104 for hydraulics, lubrication, and cooling purposes. To circulate the fluid, the hybrid module 104 includes a mechanical pump 118 and an electrical (or electric) pump 120.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112.

The energy storage system 134 in the illustrated example includes three energy storage modules 136 that are connected together, preferably in parallel, to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1 and in further detail by lines 350 and 352 in FIG. 3. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1. The energy storage modules 136 may include an energy storage module controller 380 (FIG. 3) for communicating with the transmission/hybrid control module 148. In a typical embodiment, the transmission/hybrid control module 148 and engine control module 146 each comprise a computer having a processor, memory, and input/output connections. Additionally, the inverter 132, energy storage system 134, DC-DC converter system 140, and other vehicle subsystems may also contain computers having similar processors, memory, and input/output connections.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

Figure 2:
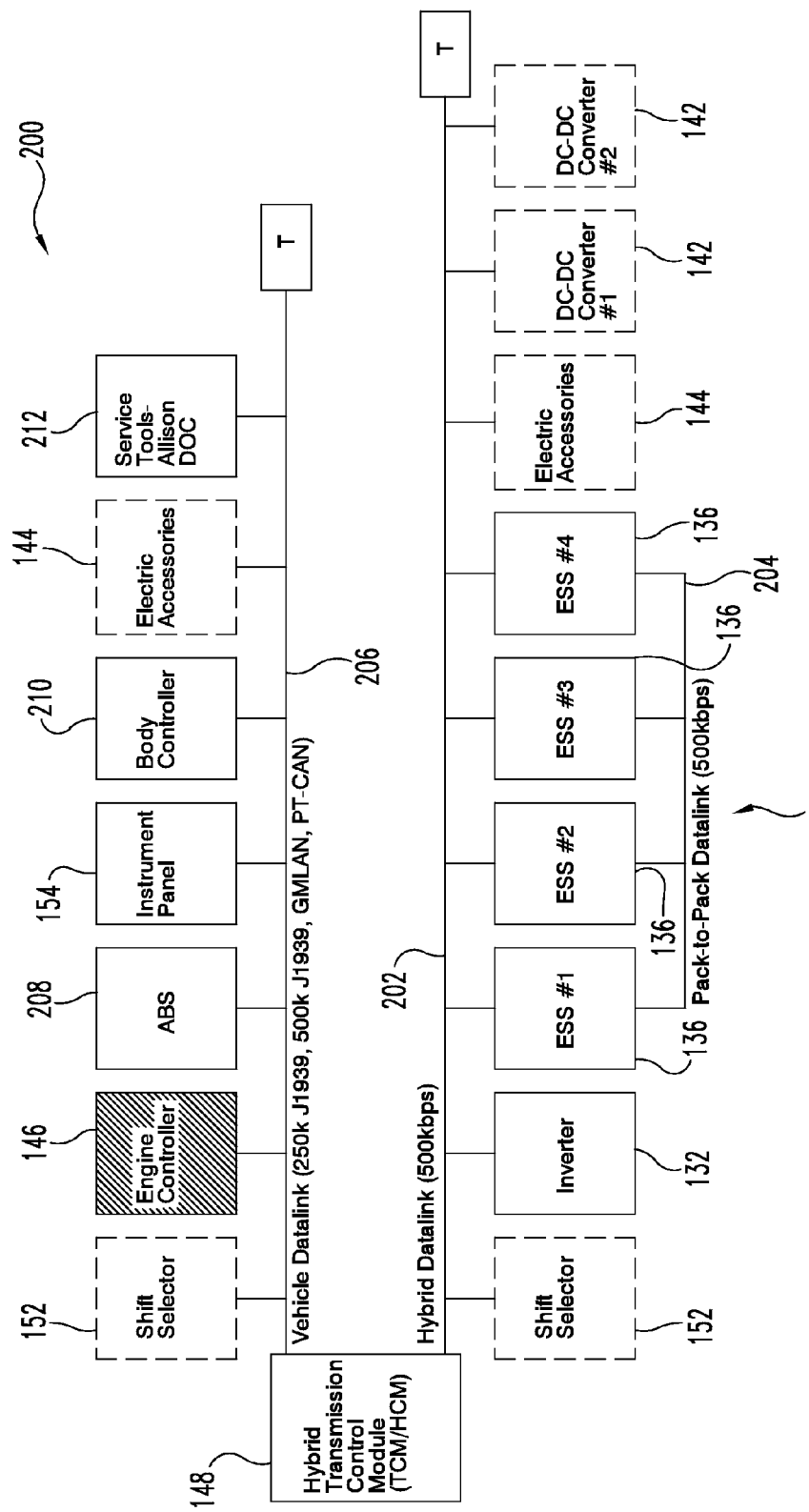
FIG. 2 illustrates a process flow diagram for balancing energy storage modules in a hybrid vehicle using the system of FIG. 1.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the shift selector 152, inverter 132, the energy storage system 134, the low voltage systems/accessories 144, and the DC-DC converter modules 142.

Within the energy storage system 134, an energy storage module data link 204 facilitates communication between the various energy storage module controllers 380. However, it is contemplated that in other embodiments the various energy storage system modules 136 can communicate with one another over the hybrid data link 202. In the illustrated example, the hybrid data link 202 and the energy storage module data link 204 each have a 500 kilobit/second (kbps) transmission rate, but it is envisioned that data can be transferred at other rates in other examples. Other components of the vehicle communicate with the transmission/hybrid control module 148 via a vehicle data link 206. In particular, the shift selector 152, the engine control module 146, the instrument panel 154, an antilock braking system 208, a body controller 210, the low voltage systems/accessories 144, and service tools 212 are connected to the vehicle data link 206. For instance, the vehicle data link 206 can be a 250 k J1939-type data link, a 500 k J1939-type data link, a General Motors LAN, or a PT-CAN type data link, just to name a few examples. All of these types of data links can take any number of forms such as metallic wiring, optical fibers, radio frequency, and/or a combination thereof, just to name a few examples.

In terms of general functionality, the transmission/hybrid control module 148 receives power limits, capacity available current, voltage, temperature, state of charge, status, and fan speed information from the energy storage system 134 and the various energy storage modules 136 within. The transmission/hybrid control module 148 in turn sends commands for connecting the various energy storage modules 136 so as to supply voltage to and from the inverter 132. From the inverter 132, the transmission/hybrid control module 148 receives a number of inputs such as the motor/generator torque that is available, the torque limits, the inverter's voltage current and actual torque speed. Based on that information, the transmission/hybrid control module 148 controls the torque speed and the pump 130 of the cooling system. From the inverter 132, it also receives a high voltage bus power and consumption information. The transmission/hybrid control module 148 also monitors the input voltage and current as well as the output voltage and current along with the operating status of the individual DC-DC converter modules 142 of the DC-DC converter system 140. The transmission/hybrid control module 148 also communicates with and receives information from the engine control module 146 and in response controls the torque and speed of the engine 102 via the engine control module 146.

Figure 3:
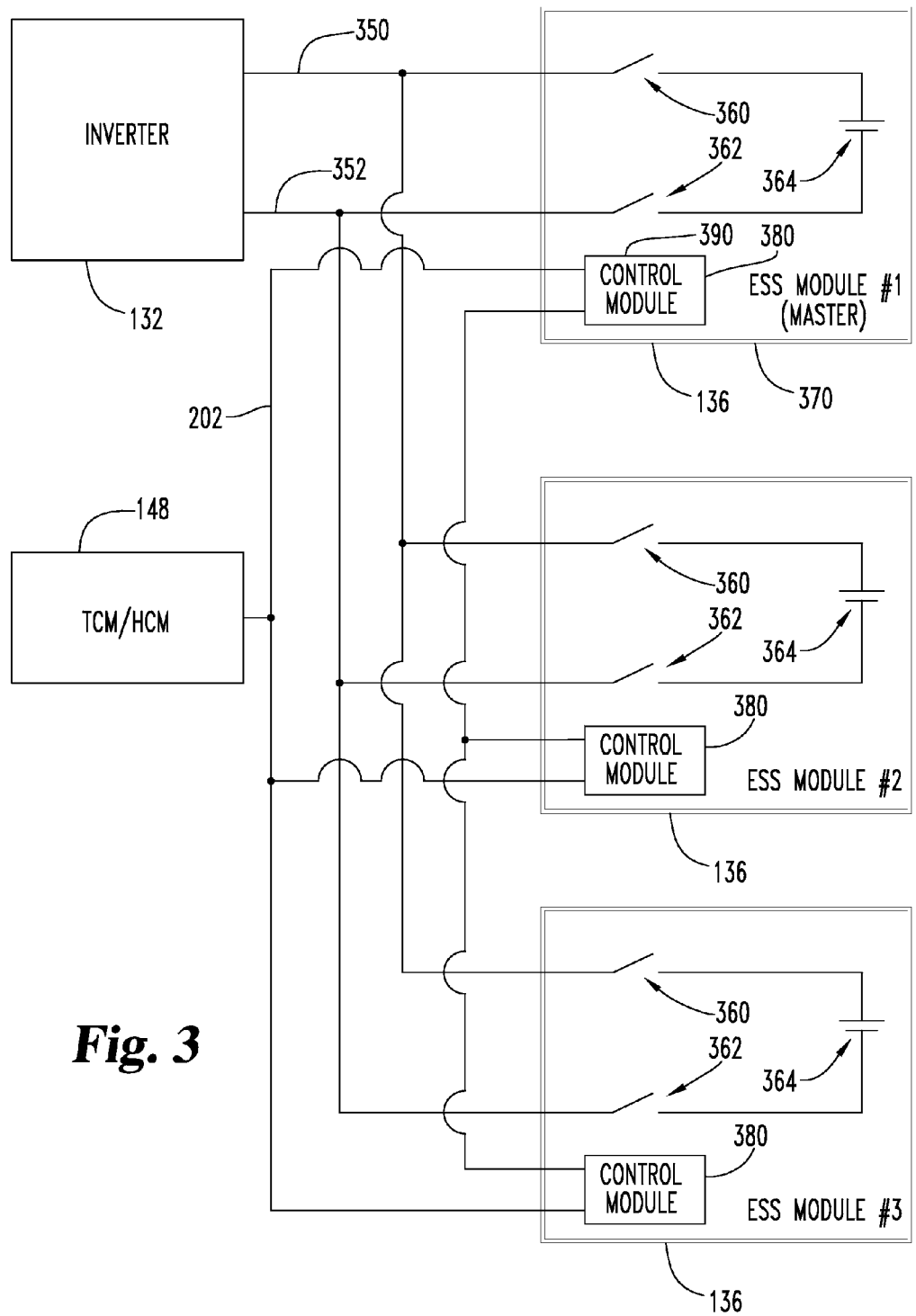
FIG. 3 illustrates a schematic block diagram of high voltage connections between an example energy storage modules and an example inverter, and control connections between the example energy storage modules and an example hybrid controller according to one embodiment.

FIG. 3 illustrates an additional schematic diagram of the high voltage power connections from the inverter 132 to the energy storage modules 136. As shown, the energy storage modules 136 are connected to high voltage lines 350 and 352 in parallel. Within the energy storage modules 136, high voltage contactors 360 and 362 are connected between high voltage batteries 364 and the high voltage lines 350 and 352. The contactors 360 and 362 are configured to connect or disconnect the batteries 364 to or from the inverter 132 as commanded by individual energy storage module controllers 380, which in turn are in communication with transmission/hybrid control module 148 via hybrid datalink 202.

Figure 4:
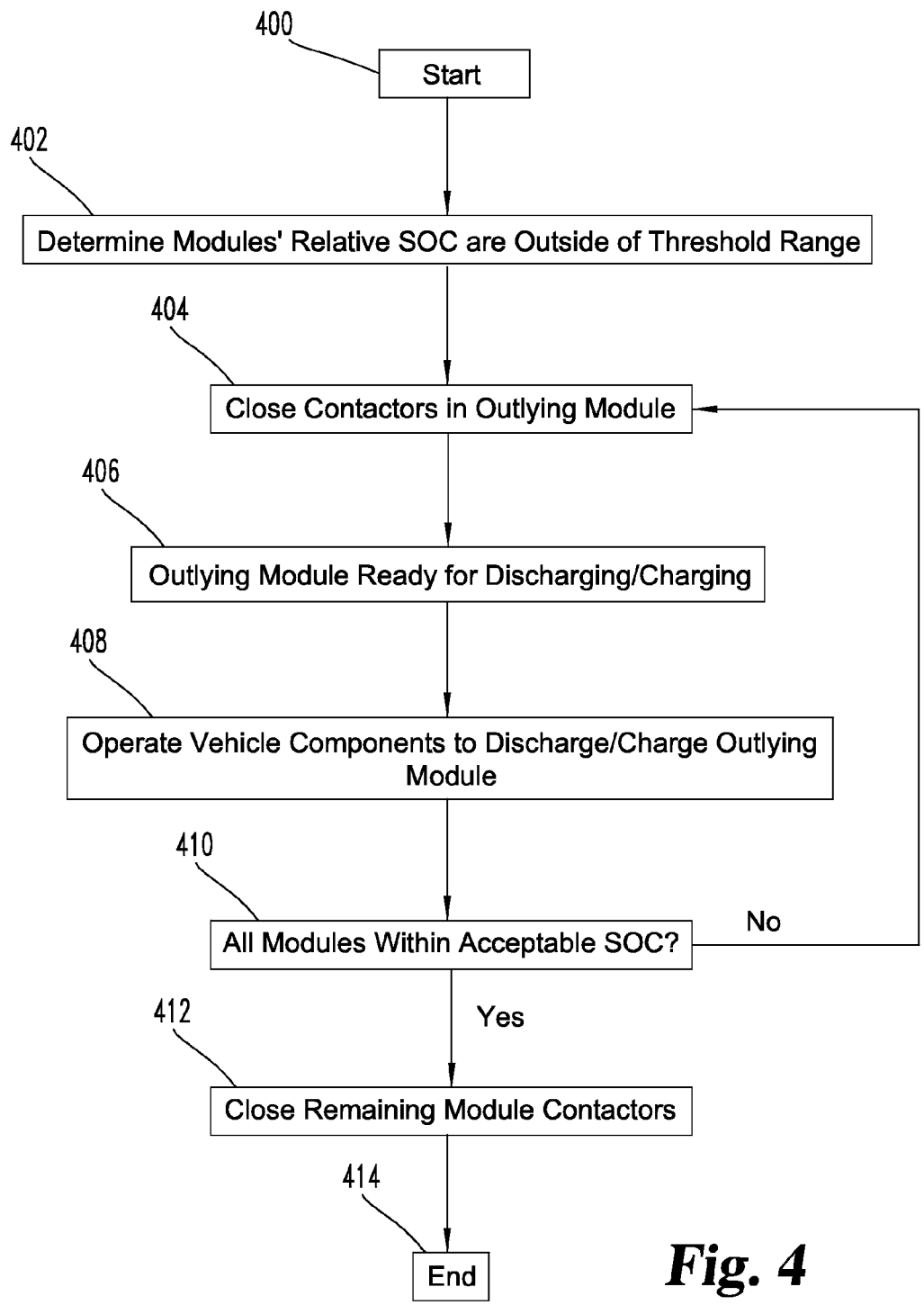
FIG. 4 illustrates a process flow diagram for balancing energy storage modules in a hybrid vehicle using the system of FIG. 1.

FIG. 4. illustrates a process for balancing the state of charge (SOC) of the energy storage modules 136 according to one embodiment. The process can be implemented using the existing hardware of the system 100 via software control. The process also does not require direct energy transfer between the individual energy storage modules 136, thereby preventing the transfer losses of prior art systems. The process begins at start point 400, where a master energy storage controller 390 in a master energy storage module 370 determines that at least one energy storage module 136 has a difference in state of charge that exceeds a predetermined tolerance with respect to the remaining energy storage modules 136 (stage 402). The master energy storage module controller 390 is in communication the other energy storage module controllers 380 and is therefore aware of the SOC for the other energy storage modules 136. It shall be understood that the determination may be based on a differential between the energy storage modules 136, a differential between each energy storage module 136 and a predetermined SOC value, or any other method used to determine that the energy storage modules 136 have differing states of charge.

At stage 404, the master energy storage module controller 390 closes the contactors 360 and 362 on a selected energy storage module 136 having a SOC which is farthest from the tolerance (the outlying module), while the contactors 360 and 362 in the remaining energy storage modules 136 remain open. In other embodiments, multiple energy storage modules 136 may be selected which have states of charge outside the desired tolerance or threshold and may have their contactors closed simultaneously.

At stage 406, the master energy storage module controller 390 communicates to the transmission/hybrid control module 148 that the selected energy storage module 136 is ready for discharging (or charging), in order to bring it within tolerance with respect to the remaining energy storage modules' SOC.

At stage 408, the transmission/hybrid control module 148 operates various vehicle components to discharge (e.g., propel the vehicle, operate vehicle accessories, etc.) or charge (e.g., via regenerative braking) the selected energy storage module 136 until it reaches a SOC within the tolerance of the remaining energy storage modules 136. In certain embodiments, the state of charge may be monitored as the vehicle is being operated using the selected energy storage module controller 380, the master energy storage module controller 390, or transmission/hybrid control module 148, to ensure that the vehicle is only run in this fashion for the necessary time.

At stage 410, the SOC of the selected energy storage module 136 reaches the SOC of a second energy storage module 136, where the state of charge of the second energy storage module is also outside the tolerance of the remaining modules (assuming more than two modules were initially found to have a SOC outside the tolerance). At this point, the contactors 360 and 362 on the second energy storage module 136 close and the process returns to stage 404 where the two selected energy storage modules are simultaneously discharged (or charged) until reaching the required SOC. The process repeats until all of the energy storage modules 136 are determined to have a SOC within the desired tolerance and the contactors in the remaining energy storage modules are closed (stage 412), with the process ending at stage 414.

It shall be understood that the above system and method may be utilized in vehicle energy storage systems as well as other non-vehicle energy storage systems where multiple energy storage modules are required.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method, comprising:
using a controller to determine the states of charge of individual energy storage modules of a plurality of energy storage modules, wherein said energy storage modules include multiple individual battery cells electrically connected together, and wherein said energy storage modules include switching devices configured to selectively electrically connect the individual energy storage module to a motor generator in a hybrid electric vehicle;
using the controller to determine states of charge differentials for the individual energy storage modules, wherein the states of charge differentials correspond to differences between the states of charge of the individual energy storage modules;
determining one or more first and one or more second energy storage modules of the plurality of energy storage modules, wherein the first energy storage modules have a corresponding state of charge differential that is greater than a predetermined tolerance;
engaging the switching devices for the first energy storage modules to electrically connect them to the motor generator using the controller;
engaging the switching devices for the second energy storage modules to electrically disconnect them to the motor generator using the controller; and
supplying power to the motor generator by discharging the first energy storage modules and not the second energy storage modules.

2. The method of claim 1, wherein power is supplied to the motor generator using the first one of said energy storage modules until the state of charge of the first energy storage module is within said tolerance relative to the remaining energy storage modules of the plurality of energy storage modules.

3. The method of claim 1, further comprising:
determining that the state of charge of said first energy storage modules have reached a level substantially equal to a second one of said energy storage modules;
supplying power to the motor generator by engaging the switching devices for the second energy storage modules to electrically connect them to the motor generator; and
operating the vehicle using the first and second energy storage modules.

4. The method of claim 3, wherein the hybrid vehicle is operated using the first and second energy storage modules until the states of charge of said first and second energy storage modules is within said tolerance relative to the remaining energy storage modules of the plurality of energy storage modules.

5. The method of claim 1, wherein said vehicle operation uses energy stored in the first energy storage modules to assist in propulsion of the vehicle.

6. The method of claim 1, wherein said vehicle operation at least partially charges the first energy storage modules at a different time than the discharging of the first energy storage modules.

7. The method of claim 6, wherein said vehicle operation comprises using energy collected during regenerative braking to charge the first energy storage modules.

8. The method of claim 1, further comprising:
determining the states of charge of the individual energy storage modules after the vehicle has been operating using said first energy storage modules;
verifying that the states of charge of the first energy storage modules is within the tolerance using the controller; and
operating the vehicle using the first energy storage modules in addition to at least one additional energy storage module.

9. The method of claim 1, wherein an energy storage module controller operatively communicates with a hybrid controller to signal that the subset of the plurality of energy storage modules are ready to be charged or discharged.

10. The method of claim 9, wherein the hybrid controller performs said vehicle operation.

11. The method of claim 1, further comprising:
closing at least one high voltage contactor between the motor generator and at least one of the first energy storage modules using the controller, wherein the switching devices are high voltage contactors responsive to the controller.

12. The method of claim 11, wherein said at least one high voltage contactor is located within the at least one of the first energy storage modules.

13. The method of claim 1, wherein the plurality of energy storage modules are electrically connected to an inverter that is electrically connected to the motor generator.

14. A system for balancing a state of charge of energy storage modules in a hybrid vehicle, comprising:
a plurality of energy storage modules having multiple separate battery cells adapted to store and provide electrical energy to the hybrid electric vehicle;
a motor generator electrically connected to the energy storage modules;
a switching device electrically connected between the motor generator and an energy storage module; and
a controller operatively connected to the energy storage modules, wherein the controller is configured to:
determine states of charge differentials for the individual energy storage modules, wherein the states of charge differentials represent corresponding differences between the states of charge of the individual energy storage modules;
determine one or more first and one or more second energy storage modules of the plurality of energy storage modules, wherein the first energy storage modules have a corresponding state of charge differential that is greater than a predetermined tolerance;
command the switching devices for the first energy storage modules to electrically connect the motor generator to the first energy storage modules; and
command the switching devices for the second energy storage modules to electrically disconnect the motor generator from the second energy storage modules.

15. The system of claim 14, wherein the controller is further configured to operate the hybrid vehicle using the first energy storage modules of said plurality of energy storage modules until the state of charge of the first energy storage modules is within said tolerance relative to the remaining said energy storage modules of said plurality of energy storage modules.

16. The system of claim 14, wherein the controller is further configured to:
determine that the state of charge of said first energy storage modules has reached a level substantially equal to the second energy storage modules; and
command the switching devices for the first and second energy storage modules to electrically connect the motor generator to the first and second energy storage modules.

17. The system of claim 16, wherein the controller is further configured to supply power to the motor generator using the first and second energy storage modules until the states of charge of said first and second energy storage modules is within said tolerance relative to the remaining energy storage modules of said plurality of energy storage modules.

18. The system of claim 14, wherein said vehicle operation uses energy stored in the first energy storage modules to assist in propulsion of the vehicle.

19. The system of claim 14, wherein said vehicle operation at least partially charges the first energy storage modules at a different time than the discharging of the first energy storage modules.

20. The system of any one of claim 19, wherein said vehicle operation comprises using energy collected during regenerative braking to charge the first energy storage modules.

21. The system of claim 14, wherein the controller is further configured to:
determine the states of charge of the individual energy storage modules after the vehicle has been operating using said first energy storage modules;
verify that the states of charge of the first energy storage modules is within the tolerance; and
operate the vehicle using the first energy storage modules in addition to at least one additional energy storage module of the plurality of energy storage modules.

22. The system of claim 14, wherein an energy storage module controller operatively communicates with a hybrid controller to signal that the first energy storage modules are ready to be charged or discharged.

23. The system of claim 22, wherein the hybrid controller performs said vehicle operation.

24. The system of claim 14, wherein the switching devices are high voltage contactors responsive to the controller; and wherein the controller is further configured to:
- close at least one high voltage contactor between the vehicle power source and at least one of the first energy storage modules.

25. The system of claim 24, wherein said at least one high voltage contactor is located within the at least one of the first energy storage modules.

26. The system of claim 14, wherein the plurality of energy storage modules are electrically connected to an inverter that is electrically connected to the motor generator.

* * * * *